United States Patent [19]
Mizoguchi

[11] Patent Number: 5,984,595
[45] Date of Patent: Nov. 16, 1999

[54] TOOL HOLDER

[75] Inventor: Haruki Mizoguchi, Ikoma, Japan

[73] Assignee: MST Corporation, Ikomi, Japan

[21] Appl. No.: 09/114,908

[22] Filed: Jul. 14, 1998

[30] Foreign Application Priority Data

Jul. 29, 1997 [JP] Japan ................................ 9-203555
Jun. 10, 1998 [JP] Japan ............................... 10-161683

[51] Int. Cl.⁶ .......................... B23B 51/06; B23B 31/20
[52] U.S. Cl. ......................... 408/57; 279/20; 279/46.9; 279/53; 279/157; 285/113; 408/56; 409/136
[58] Field of Search ........................ 279/20, 46.9, 52, 279/53, 54, 157; 408/56, 57, 59; 409/136, 234; 285/113

[56] References Cited

U.S. PATENT DOCUMENTS

| | | | |
|---|---|---|---|
| 3,534,776 | 10/1970 | Gilreath | 285/113 |
| 4,815,899 | 3/1989 | Regan | 279/52 |
| 5,340,127 | 8/1994 | Martin | 408/57 |
| 5,567,093 | 10/1996 | Richmond | 408/57 |
| 5,649,714 | 7/1997 | Uchida et al. | 279/20 |

FOREIGN PATENT DOCUMENTS 2273255  6/1994  United Kingdom ............... 409/136

*Primary Examiner*—Steven C. Bishop
*Attorney, Agent, or Firm*—Burns, Doane, Swecker & Mathis, LLP

[57] ABSTRACT

A tool holder having a holder body, a collet, an intermediate rod, a clamp bolt and a pull stud. The collet and the intermediate rod are integrally connected by screwing. A spacer is mounted to the front end of the holder body and has an opening hole with a diameter nearly matching with the diameter of the shank portion of the cutting tool. In the opening hole, a tapered groove portion with an enlarged diameter portion on the rear and a reduced diameter portion on the front is formed, and in this groove portion, a sealing O-ring is mounted. A cap for holding the spacer is screwed down to the front portion of the holder body, and the cap and the holder body come in pressure-contact at each other's tapered surfaces.

15 Claims, 6 Drawing Sheets

TOOL HOLDER

BACKGROUND OF THE INVENTION

1. Field of the Invention

The present invention relates to a tool holder, and more specifically, to a tool holder for mounting a cutting tool such as drills, end mills, etc. to a main spindle of a machine tool.

2. Description of Related Art

Conventionally, it is known in the art of tool holder that the top end portion of a holder body or the rear end portion of a cutting tool is sealed for supply of coolant to processed portions or for dust prevention.

FIG. 6 shows a conventional construction for sealing the top end portion of a holder body 1. A spacer 52 is mounted to the top end portion of the holder body 1 via a cap 50 fixed with a bolt 51, and to an opening hole portion 53 of the spacer 54, an O-ring 54 is mounted. A cutting tool 40 has a shank portion 40a inserted into a collet 10 through the opening hole portion 53, and pressed and held to the collet 10. Coolant is supplied from the arrow "b" direction through the inside of the holder body 1 and spouted from the head end of the tool 40 through a center hole (not illustrated) of the cutting tool 40. Under this configuration, the coolant has pressure in the arrow "b" direction, but sealing is achieved by the O-ring 54 and an O-ring 55 inserted between the cap 50 and the spacer 52.

On the other hand, FIG. 7 shows a conventional construction in which the rear end of the cutting tool 40 is brought into contact with a top and tapered surface 15a of an intermediate rod 15 for sealing. Coolant is supplied to a center hole 42 of the cutting tool 40 through a center hole 17 of the intermediate rod 15.

Now, the sealing construction shown in FIG. 6 has a problem in that the cutting tool 40 must have a shank with a diameter same as the inside diameter of the O-ring 54. In general, various cutting tools with varying diameters in increments of 0.1 mm are used. It would be convenient if cutting tools with varying shank diameters within the range from the inside diameter of the O-ring 54 to 1 mm larger can be used with one type of spacer 52, for example, if cutting tools with shank diameters up to 13 mm in increments of 0.1 mm can be used when the inside diameter of the O-ring 54 is 12 mm.

On the other hand, in the sealing construction shown in FIG. 7, the intermediate rod 15 travels integrally with the collet 10, in other words, when the collet 10 is retracted backward (in arrow "A" direction) to tighten the cutting tool 40, the intermediate rod 15 is also retracted in this event. Consequently, pressure-contacting force between the rear end of the cutting tool 40 and the tapered surface 15a of the intermediate rod 15 is unable to be satisfactorily secured, creating a problem of insufficient sealing effect.

A conventional tool holder has a problem in that the machining accuracy is degraded by vibration in the cutting tool generated during high-speed rotation because the axial center of the cap 50 does not coincide precisely with the axial center of the holder body 1, thereby losing the balance. The cap 50 is fixed to the holder body 1 with bolts 51 using a tightening tool such as a wrench, etc., but it is difficult to fix completely coaxially to the holder body 1. In addition, because the cutting tool is rotated as high as 14,000 rpm in recent years, occurrence of vibration becomes conspicuous even if the axial misalignment of the cap 50 is negligibly small.

SUMMARY OF THE INVENTION

Accordingly, it is an object of this invention to provide a tool holder that exhibits sufficient sealing effects at the top end portion of the holder body even when the shank diameter of the cutting tool slightly differs.

It is another object of this invention to provide a tool holder that exhibits sufficient sealing effects at the rear end portion of a retracting type cutting tool.

It is another object of this invention to provide a tool holder that can accurately match the axial center of a cap mounted to the front surface portion of the holder body with the axial center of the holder body.

In order to achieve the above object, the tool holder according to the present invention has a removable sealing spacer equipped to the front end of the holder body, and the spacer has an opening hole with a diameter nearly matching with that of a shank portion of a cutting tool. In the opening hole, a tapered groove portion with an enlarged diameter portion on the rear and a reduced diameter portion on the front is formed, and an annular elastic member for sealing is mounted in the tapered groove portion.

In the present invention, basically, a cutting tool with a shank portion of the diameter same as the inside diameter of the annular elastic member is used. When coolant is supplied, the annular elastic member is pressed into the reduced diameter portion of the tapered groove portion by the coolant and seals the front end of the holder body. Even if the diameter of the shank portion inserted in the opening hole is about 1 mm larger than the inside diameter of the annular elastic member, the annular elastic member travels to the enlarged diameter portion to hold the elasticity. In such an event, when the coolant is supplied, the annular elastic member is pressed into the reduced diameter portion of the tapered groove portion by the coolant and seals the front end of the holder body.

According to the present invention, the annular elastic member is pushed into the reduced diameter portion by coolant pressure and exhibits good sealing effects, and even a cutting tool with a shank portion with a diameter slightly greater than the inside diameter of the annular elastic member can be inserted because the annular elastic member travels to the enlarged diameter portion. Thus, cutting tools with varying diameters can be used with one type of spacer and annular elastic member.

In addition, a tool holder according to the present invention is of a collet retracting type, and in the center hole of the holder body, a liquid supply rod whose rear end comes in contact with the front end of a clamp bolt is provided, and at the front end of this liquid supply rod, a pressure-contacting surface is formed with which the rear end of a cutting tool comes in pressure-contact.

In the present invention, a cutting tool is inserted into the collet until the rear end comes into pressure-contact with the front end pressure-contact surface of the liquid supply rod. Rotating the clamp bolt in a direction to tighten the cutting tool causes the clamp bolt to rotate at a specified position and retracts the collet into the holder body. In this event, the liquid supply rod comes into contact with the front end of the clamp bolt and is held in the position, and the rear end of the cutting tool retracted integrally with the collet comes in still stronger pressure-contact with the pressure-contact surface of the liquid supply rod. Coolant is supplied from the liquid supply rod to the cutting tool.

According to the present invention, the retracting force applied to the collet provides the front end pressure-contact surface of the liquid supply rod and the rear end of the cutting tool with pressure-contact force, thereby attaining good sealing effect.

Further, a tool holder according to the present invention has a cap mounted to the front end of the holder body, and the cap and the holder body are in pressure-contact in the axial direction at each other's tapered surfaces. The tapered surfaces are able to allow axial centers to coincide accurately compared with cases of fitting shafts or sylinders. Consequently, even if the tool holder is rotated at a high speed, vibration is not caused by deviation of the balance (axial center), and the machining accuracy can be kept high.

BRIEF DESCRIPTION OF THE DRAWINGS

These and other objects and features of the present invention will become apparent from the following description with reference to the accompanying drawings, in which.

DETAILED DESCRIPTION OF THE PREFERRED EMBODIMENTS

Figure 1:
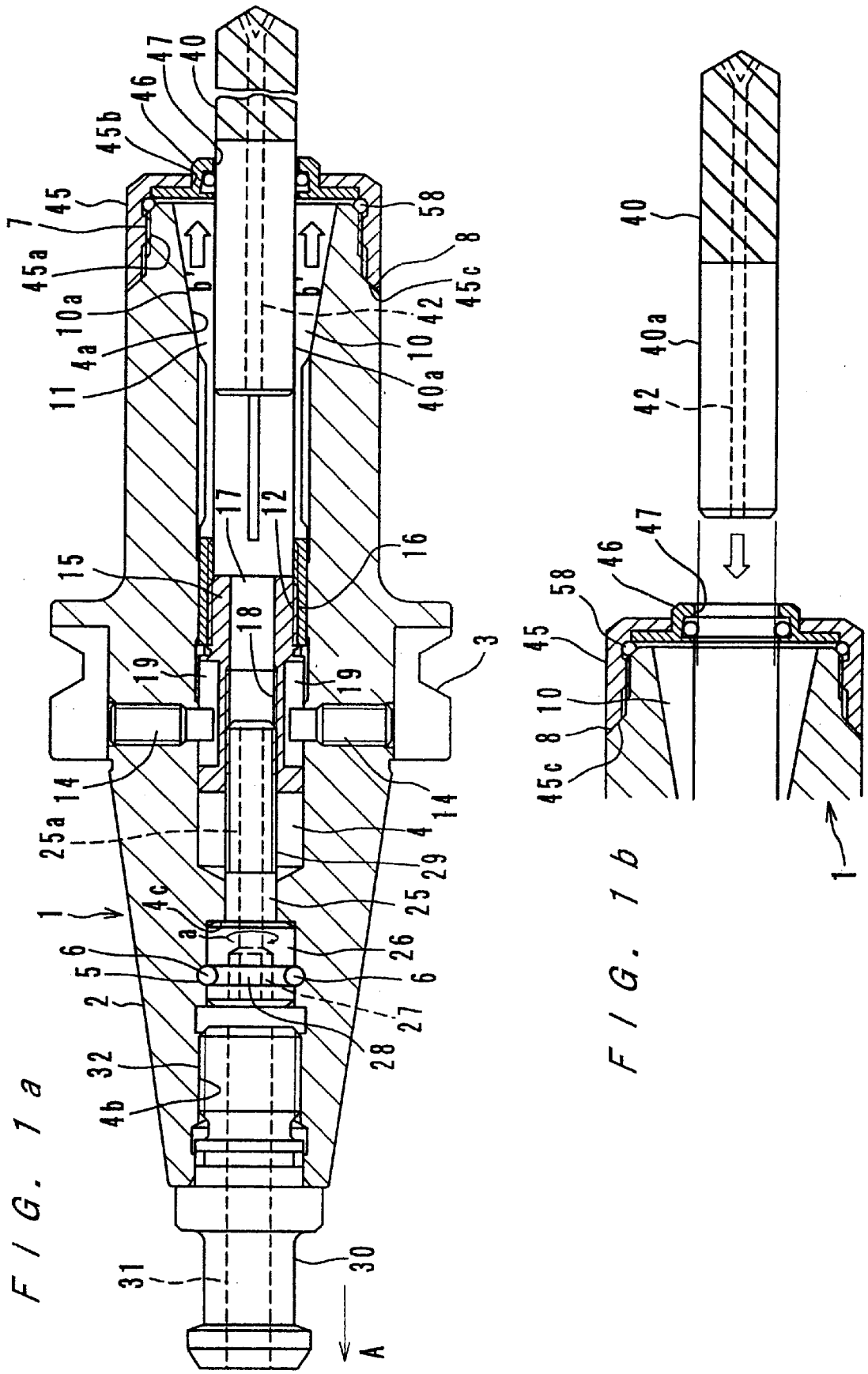
FIGS. 1a and 1b are cross-sectional views showing a tool holder of the first embodiment according to the present invention.

Referring now to the drawings, preferred embodiments according to the invention will be described in detail hereinafter.

Figure 2:
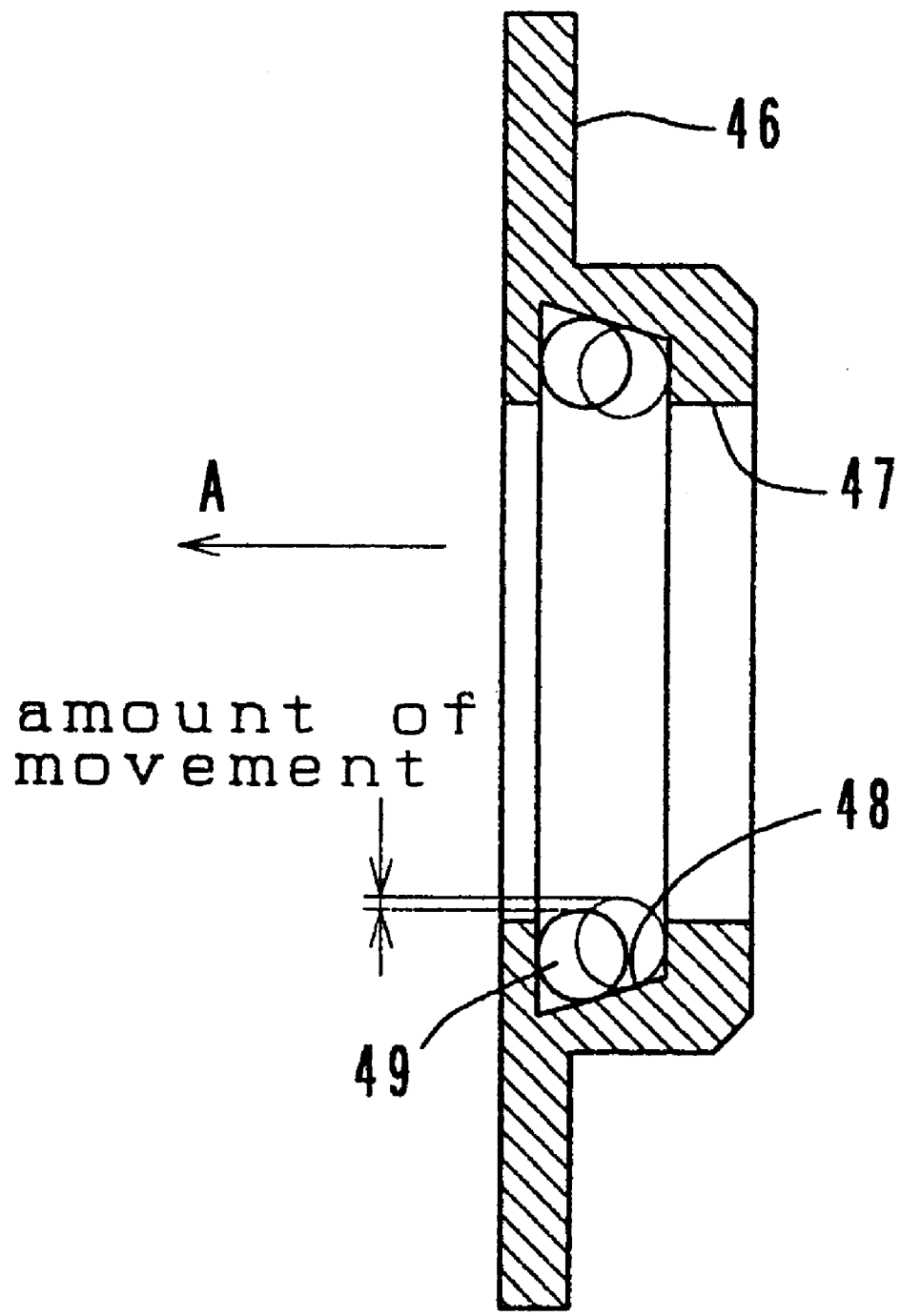
FIG. 2 is an enlarged cross-sectional view showing a sealing spacer used in the tool holder.

(First Embodiment: see FIGS. 1, 2 and 3.)

In FIGS. 1a and 1b, the tool holder of the first embodiment according to the present invention comprises a holder body 1, a spring collet 10, an intermediate rod 15, a clamp bolt 25, a pull stud 30, a cap 45 and a spacer 46.

The holder body 1 has a tapered shank portion 2 to be inserted in the main spindle of the machine tool on the rear portion in the arrow "A" direction, a manipulator holding portion 3 at the intermediate portion. A center hole 4 passing through the holder body 1 is formed, and on the inner circumferential surface of the front portion, a tapered hole portion 4a is formed.

The spring collet 10 has a split claw portion 11 with a tapered portion 10a and a threaded portion 12, and is inserted into the center hole 4 of the holder body 1 from the front. Allowing the tapered portion 10a to come in pressure-contact with the tapered hole portion 4a of the holder body 1 bends the split claw portion 11 inward and holds the shank portion 40a of the cutting tool 40. The intermediate rod 15 has a threaded portion 16 on the front outer circumferential surface, a threaded portion 18 on the rear portion of a center hole 17, and a groove 19 extending in the axial direction on the outer circumferential surface. This intermediate rod 15 is integrally connected to the collet 10 by screwing the threaded portion 16 to the threaded portion 12 of the collet 10, and is inserted in the center hole 4 of the holder body 1. By engaging the tip end of the guide screw 14 screwed down from the outer circumferential surface of the holder body 1 with the groove 19, the intermediate rod 15 is set to the state in which the rod can move in the axial direction but does not rotate.

The clamp bolt 25 has a head 26 and a threaded portion 29. The clamp bolt 25 is inserted into the center hole 4 of the holder body 1 from the rear, and the threaded portion 29 is screwed down to the threaded portion 18 of the intermediate rod 15. At the head 26, a hexagonal hole 27 is formed, and on the outer circumferential surface, a ring groove 28 with a nearly semi-circular cross section is formed. On the other hand, in the center hole 4 of the holder proper 1, a ring groove 5 with a semi-circular cross section is formed at the position opposite to the groove 28, and in the grooves 5 and 28, a plurality of steel balls 6 are mounted. In order to mount steel balls 6, holes (not illustrated) in free communication with the outer circumferential surface of the holder body 1 are formed from the groove 5, and after inserting the clamp bolt 25 into the center hole 4, steel balls 6 are mounted to the grooves 5 and 28 through the free communication holes. The free communication holes are stopped up by screwing down a pin (not illustrated) after mounting the steel balls 6.

The pull stud 30 has a through hole 31 and has a tip-end threaded portion 32 screwed down to the threaded portion 4b formed on the rear portion of the center hole 4 of the holder body 1. When the holder body 1 is inserted into the main spindle of a machine tool, the pull stud 30 is retracted by a clamp mechanism inside the main spindle. With this operation, the tapered shank portion 2 is pressed against a tapered hole portion of the main spindle.

The cap 45 is fitted to the holder body 1 by screwing a female thread 45a formed on the inner circumferential surface into a male thread 7 formed on the outer circumference surface of the holder body 1, so that the cap 45 is detachable from the holder body 1. Between this cap 45 and the holder body 1, an O-ring 58 is intervened. A spacer 46 is fitted into an opening hole 45b of the cap 45, and mounted opposite to the front end surface of the holder body 1 while locked by the cap 45.

The spacer 46 has an opening hole 47, and as shown in FIG. 2, a tapered groove portion 48 with an enlarged diameter portion on the rear (arrow "A" direction) and a reduced diameter portion on the front is formed on the opening hole 47. In addition, to the groove portion 48, an O-ring 49 for sealing is mounted. The cutting tool 40 has the shank portion 40a inserted and held into the collet 10 from the opening hole 47 of the spacer 46, and the coolant is supplied from the main spindle of the machine tool (not illustrated). The coolant to the center hole 42 flows in the through hole 31 of the pull stud 30, the center hole 25a of the clamp bolt 25, the center hole 17 of the intermediate rod 15 and the collet 10 to reach the rear end of the cutting tool 40. Further, the coolant flows in the center hole 42 of the cutting tool 40 and is spouted from the end nozzle portion branched off into two. The mounting and removing method of the cutting tool 40 will be described later.

Figure 3A:
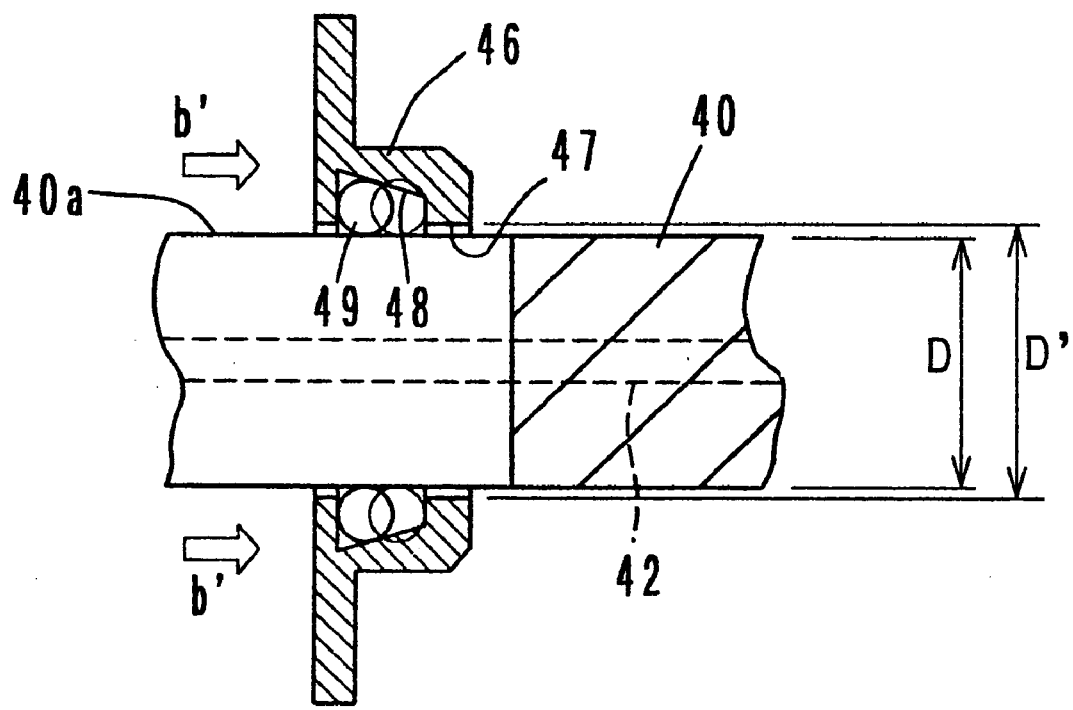
FIGS. 3a and 3b are cross-sectional views showing the sealing portion of the tool holder; especially FIG. 3a showing a case of using a cutting tool with a reference diameter and FIG. 3b showing a case of using a cutting tool with a larger diameter.

Now, in the first embodiment, the spacer 46 and the O-ring 49 are used to meet the cutting tool 40 with a diameter D as shown in FIG. 3a. The O-ring 49 has an inside diameter D, and the opening hole 47 has a diameter D' (D'>D). For example, D is 12 mm, and D' is 13 mm. Inserting the shank portion 40a of the cutting tool 40 into the opening hole 47 of the spacer 46 causes the O-ring 40 to travel to the enlarged diameter portion of the groove portion 48. When the coolant is supplied, he O-ring 49 travels to the reduced diameter portion side and is compressed by the pressure in the arrow "b" direction, and seals the periphery of the cutting tool 40.

Figure 3B:
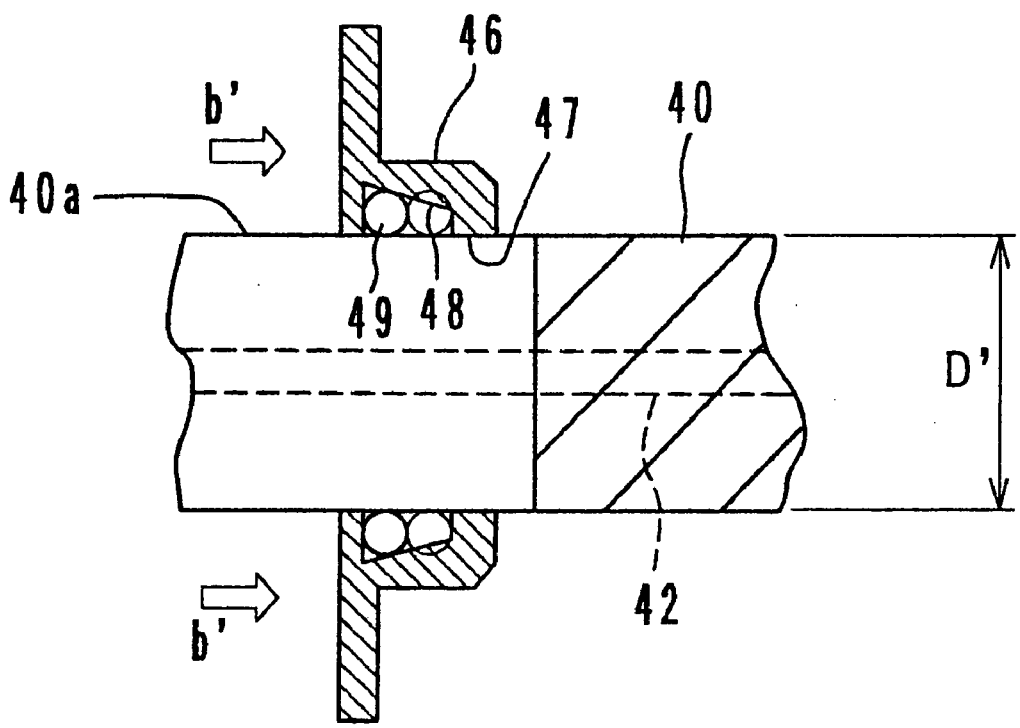

In the meantime, as shown in FIG. 3b, in the first embodiment, it is possible to use a cutting tool 40 with a diameter larger than the inside diameter D of the O-ring 49. FIG. 3b shows the case when a cutting tool 40 with a diameter D' of 13 mm is inserted to the O-ring 49 with an inside diameter D of 12 mm. In this case, the O-ring 49 is pushed into the enlarged diameter portion of the groove portion 48 while being pressed to expand by the shank portion 40a. When the coolant is supplied, the O-ring 49 travels to the reduced diameter portion side and is compressed by the pressure in the arrow "b'" direction as in the above-mentioned case, and seals the periphery of the cutting tool 40.

In the first embodiment, when the inside diameter D of the O-ring is 12 mm, it is possible to use cutting tools with outside diameters from 12 to 13 mm. Because cutting tools vary in outside diameter in increments of 0.1 mm, in the first embodiment, it is possible to use cutting tools with a total of 11 types of outside diameters with respect to one O-ring 49 and one spacer 46.

Next, description will be made on the cap 45. The rear end of the cap 45 is made into a tapered surface 45c, and on the front end portion of the holder body 1, a tapered surface 8 with an inclination same as the tapered surface 45c is formed. Screwing the female thread 45a of the cap 45 into the male thread 7 of the holder body 1 brings the tapered surface 45c to come into pressure-contact with the tapered surface 8. The pressure-contact of the tapered surfaces 45c and 8 mounts the cap 45 with the holder body 1 accurately coinciding with the axial center. Thereby, even when the holder body 1 is rotated and driven at a high speed, cutting operation can be maintained to high accuracy without breaking the overall balance.

The cap 45 is mounted to the thread 7 of the holder body 1 by screwing the thread 45a. This tightening is carried out by rotating the cap 45 by hand. The cap 45 may be tightened using a tool like wrench, etc., and this has an advantage of tightening the cap 45 with a large torque. However, a tool like wrench, etc. is required, and because a groove portion for engaging the wrench, etc. must be formed on the cap 45, the size of the cap 45 must be increased, creating a disadvantage of taking extra labor and time for mounting and removing the cap 45. Hand-tightening enables quick mounting and removal. However, the tightening torque lacks, and in order to solve the problem, an O-ring 58 is intervened between the cap 45 and the holder body 1. This O-ring 58 has a function as a sealing material for coolant, but it can prevent the cap 45 from loosening by being mounted between the cap 45 and the holder body 1 in a compressed state. The O-ring 58 having a function of preventing the cap 45 from loosening means that it can compensate for the short tightening torque even when a hand-tightening system is employed for the cap 45, and the reduced wall thickness and smaller diameter of the cap 45 can be thereby achieved.

Now the description will be made on mounting and removal of the cutting tool 40.

First of all, the shank portion 40a of the cutting tool 40 is inserted into the collet 10 by a specified amount, and using a hex key, the clamp bolt 25 is rotated in the arrow "a" direction. More specifically, the pull stud 30 is removed, or if the pull stud 30 is kept mounted, the hex key is inserted from the through hole 31, and the tip end of the hex key is fitted into the hexagonal hole 27 of the clamp bolt 25. In this event, the head 26 comes in pressure-contact with the stepped surface 4c formed on the center hole 4 by surface friction, and the collet 10 is pulled backward via the intermediate rod 15. With this operation, the tapered portion 10a of the collet 10 is pressed against the tapered hole portion 4a of the holder body 1, and the split crawl portion 11 tightens and holds the shank portion 40a of the cutting tool 40.

On the other hand, when the cutting tool 40 is removed, using a hex key as in the case of tightening, the clamp bolt 25 is rotated in the direction opposite to the arrow "a". In this kind of tool holder, when the collet 10 is retracted, biting phenomena occur between the tapered hole portion 4a and the tapered portion 10a, requiring a large torque to separate both.

In this first embodiment, when the clamp bolt 25 is rotated reversely, the bolt 25 tries to move backward (arrow "A" direction), but one side 28a of the groove portion 28 comes in pressure-contact with the steel balls 6, and the bolt 25 rotates reversely with the backward traveling hindered. With this operation, together with the intermediate rod 15, the collet 10 is pressed forward, and tightening to the cutting tool 40 by the split crawl portion 11 is canceled. During the reverse rotation, the steel balls 6 and the grooves 28 and 5 come in pressure-contact with each other by rolling friction, and the frictional resistance is extremely small. Therefore, the torque for releasing the biting phenomena between the tapered hole portion 4a and the tapered portion 10a is small compared with conventional ones. Accordingly, the tightening force of the collet 10 can be canceled without releasing the bite by striking the clamp bolt 25, and good operability is achieved.

Figure 4:
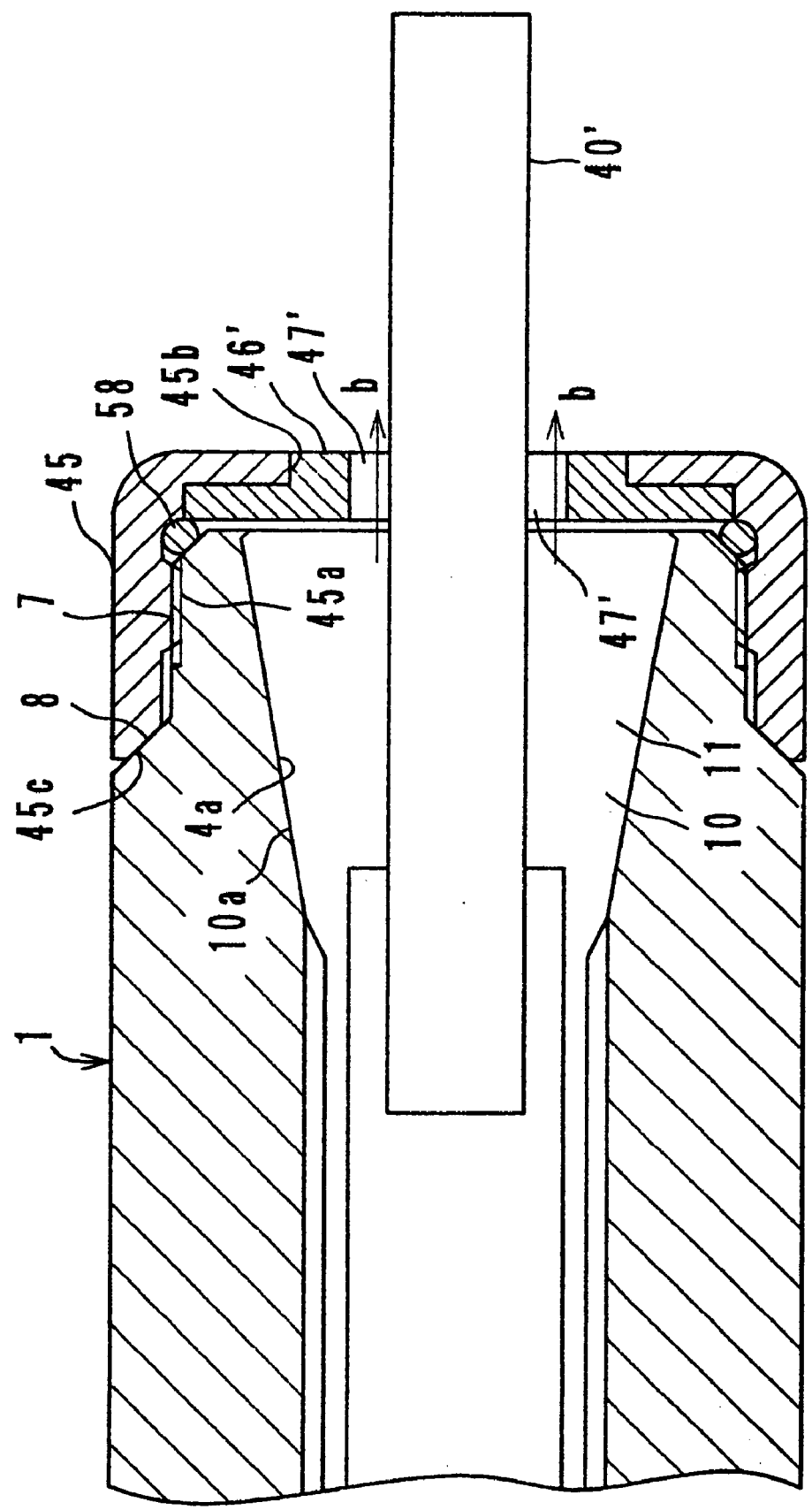
FIG. 4 is a cross-sectional view showing an essential part of a tool holder of the second embodiment according to the present invention.

(Second Embodiment: See FIG. 4.)

In the tool holder according to the second embodiment, only the spacer 46' differs from the above-mentioned spacer 46, and other configuration is same as that of the first embodiment shown in FIGS. 1a and 1b. Accordingly, in FIG. 4, members similar to those previously described with reference to FIGS. 1a and 1b are denoted by the same reference numerals, and the explanation is omitted.

The spacer 46' has a plurality of coolant supply holes 47'. The cutting tool 40' does not have a center hole 42 for coolant (see FIGS. 1a and 1b), but the coolant is supplied to the cutter of the cutting tool 40' through the supply holes 47' as shown with the arrow "b". The explanation of the first embodiment can be applied to the configuration and function of the cap 45.

(Third Embodiment: See FIG. 5.)

Figure 5:
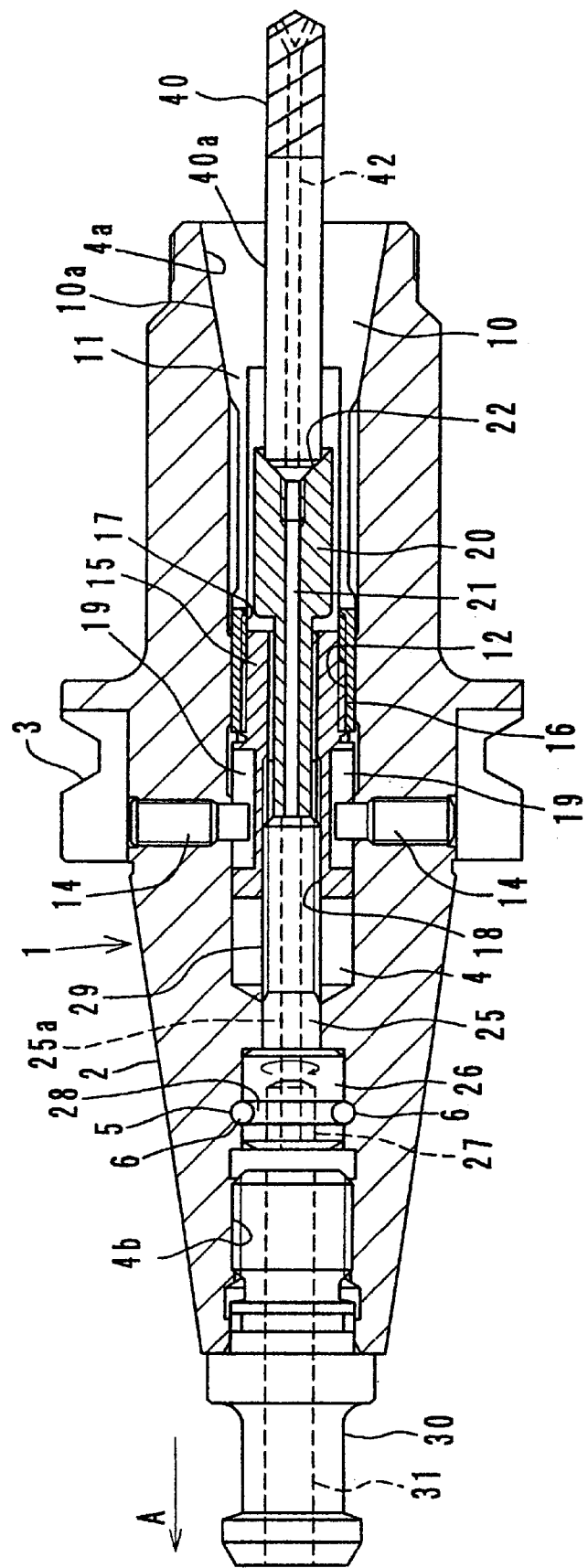
FIG. 5 is a cross-sectional view showing a tool holder of the third embodiment according to the present invention.
Figure 6:
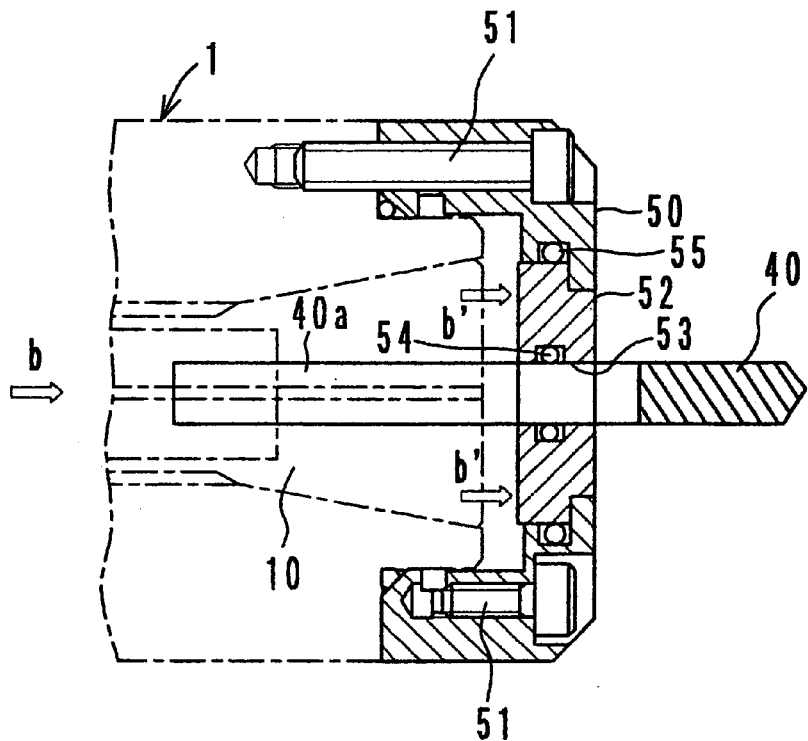
FIG. 6 is a cross-sectional view showing a conventional tool holder.
Figure 7:
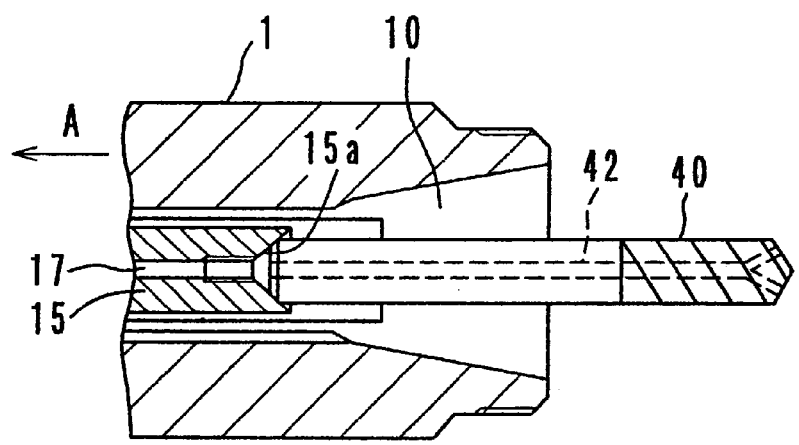
FIG. 7 is a cross-sectional view showing another conventional tool holder.

The tool holder according to the third embodiment is of a collet retracting type as in the case of the first embodiment, and is equipped with a liquid supply rod 20, and the cap 45 and the spacer 46 are omitted. In FIG. 5, members similar to those previously described with reference to FIGS. 1a and 1b are denoted by the same reference numerals, and the explanation is omitted.

The liquid supply rod 20 is located between the collet 10 and the intermediate rod 15, with the rear end in contact with the front end surface of the clamp bolt 25. This liquid supply rod 20 has a center hole 21 that passes longitudinally, and the front end of the rod 20 is formed as a tapered surface 22 that expands open forward. The cutting tool 40 is inserted into the collet 10 until the rear end portion of the shank portion 40a comes in contact with the tapered surface 22. Rotating the clamp bolt 25 in the arrow "a" direction under this condition retracts the collet 10 and the intermediate rod 15 backward as described in the first embodiment, and at the same time, the cutting tool 40 is also retracted while pressed and held by the collet 10. Meanwhile, the liquid supply rod 20 in contact with the clamp bolt 25 is held in a specified position, and the rear end portion of the cutting tool 40 is strongly brought in pressure-contact with the tapered surface 22.

The coolant flows in the through hole 31 of the pull stud 30, the center hole 25a of the clamp bolt 25 and the center hole 21 of the liquid supply rod 20, and is supplied to the center hole 42 through the rear end of the cutting tool 40. Then, the coolant is spouted from the front end nozzle portion branched off into two. With respect to the seal around the cutting tool 40, because the edge of the rear end of the shank portion 40an comes into pressure-contact with the front end tapered surface 22 of the liquid supply rod 20 when the collet 10 is retracted to press and hold the cutting tool 40, satisfactory sealing effect is exhibited, and the coolant is not allowed to leak from the split claw 11.

(Other Embodiments)

Although the present invention has been described in connection with the preferred embodiment, it is to be noted that various changes and modifications are possible to those who are skilled in the art. Such changes and modifications are to be understood as being within the scope of the present invention.

In particular, the configuration of the holder body, its mounting structure to the main spindle, the configuration of the collet, etc. are optional. In addition, the coolant may not be supplied from the main spindle of the machine tool but may be supplied from the side portion of the holder body 1.

In the first embodiment, the tool holder may not be of a collet retracting type but of a push-in type. In addition, for the sealing elastic member, annular elastic members with various cross-sectional profiles such as ellipses, squares, etc. may be used in addition to the round cross-section O-rings.

In addition, in the third embodiment, the elastic member may be provided on the tapered surface 22 of the liquid supply rod 20 by affixing, etc.

What is claimed is:

1. A tool holder for removably holding a cutting tool, comprising:
   a holder body which has, in its rear portion, a tapered shank portion to be mounted to a main spindle of a machine tool and has, in its front portion, a collet to which a cutting tool is to be removably mounted, the holder body being able to supply coolant to the cutting tool;
   a spacer for sealing the coolant supplied to the cutting tool, the spacer being able to be mounted and removed to and from a front end of the holder body and having an opening hole which has a diameter matching with that of a shank portion of the cutting tool and has a tapered groove portion with an enlarged diameter portion on the rear and a reduced diameter portion on the front;
   an annular elastic member for sealing the coolant, the elastic member being mounted to the tapered groove portion; and
   a cap for mounting the spacer to the front end of the holder body, the cap being able to be mounted and removed to and from the front portion of the holder body and being in pressure-contact with the holder body in the axial direction at tapered surfaces.

2. A tool holder as claimed in claim 1, wherein the annular elastic member is an O-ring.

3. A tool holder as claimed in claim 1, wherein the cap is mounted by engaging a female thread formed on its inner circumferential surface with a male thread formed on the outer circumferential surface of the holder body.

4. A tool holder as claimed in claim 1, wherein an elastic member is intervened between the cap and the holder body while being compressed.

5. A tool holder as claimed in claim 4, wherein the elastic member is an O-ring.

6. A tool holder for removably holding a cutting tool, comprising:
   a holder body which has, in its rear portion, a tapered shank portion to be mounted to a main spindle of a machine tool and has, in its front portion, a collet to which a cutting tool is to be removably mounted, the holder body being able to supply coolant to the cutting tool;
   a spacer which has an opening hole with a diameter matching with that of a shank portion of the cutting tool, the spacer being able to be mounted and removed to and from the front end of the holder body; and
   a cap for mounting the spacer to the front end of the holder body, the cap being able to be mounted and removed to and from the front portion of the holder body and being in pressure-contact with the holder body in the axial direction at tapered surfaces.

7. A tool holder as claimed in claim 6, wherein the cap is mounted by engaging a female thread formed on its inner circumferential surface to a male thread formed on the outer circumferential surface of the holder body.

8. A tool holder as claimed in claim 6, wherein an elastic member is intervened between the cap and the holder while being compressed.

9. A tool holder as claimed in claim 8, wherein the elastic member is an O-ring.

10. A tool holder as claimed in claim 6, wherein the spacer is intended to seal the coolant supplied to the cutting tool.

11. A tool holder as claimed in claim 10, wherein the spacer is equipped with an annular elastic member for sealing the coolant.

12. A tool holder as claimed in claim 11, wherein the annular elastic member is an O-ring.

13. A tool holder as claimed in claim 6, wherein the spacer has a supply hole for supplying the coolant to the cutting tool.

14. A tool holder for removably holding a cutting tool, comprising:
   a holder body which has, in its rear portion, a tapered shank portion to be mounted to a main spindle of a machine tool and has, in its front portion, a collet to which a cutting tool is to be removably mounted, the holder body having a center hole for supplying coolant to the cutting tool;
   a clamp bolt inserted into the center hole of the holder body from the rear, the clamp bolt having a hole for supplying the coolant and being capable of rotating forward and reversely to retract and push out the collet, thereby tightening and untightening the cutting tool;
   a liquid supply rod mounted inside the center hole of the holder body, the liquid supply rod having a rear end which is in contact with a front end of the clamp bolt and having a front end which comes into pressure-contact with a rear end of the cutting tool.

15. A tool holder as claimed in claim 14, wherein the front end of the liquid supply rod is a tapered surface with which the edge of the rear end of the cutting tool comes in pressure-contact.

* * * * *

UNITED STATES PATENT AND TRADEMARK OFFICE
CERTIFICATE OF CORRECTION

PATENT NO. : 5,984,595
DATED : November 16, 1999
INVENTOR(S) : Haruki MIZOGUCHI

It is certified that error appears in the above-identified patent and that said Letters Patent is hereby corrected as shown below:

On the title page, in Section [73], delete "Ikomi" and insert -- Ikoma --.

Signed and Sealed this

Fifth Day of September, 2000

Attest:

Q. TODD DICKINSON

*Attesting Officer*  *Director of Patents and Trademarks*